(12) United States Patent
Muthiah

(10) Patent No.: US 10,841,645 B1
(45) Date of Patent: Nov. 17, 2020

(54) STORAGE SYSTEM AND METHOD FOR VIDEO FRAME SEGREGATION TO OPTIMIZE STORAGE

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/708,091

(22) Filed: Dec. 9, 2019

(51) Int. Cl.
*H04N 21/4335* (2011.01)
*G11B 27/30* (2006.01)

(52) U.S. Cl.
CPC ..... *H04N 21/4335* (2013.01); *G11B 27/3081* (2013.01)

(58) Field of Classification Search
CPC .......... H04N 21/4335; G11B 27/3081
See application file for complete search history.

(56) References Cited

U.S. PATENT DOCUMENTS

| | | | |
|---|---|---|---|
| 5,099,150 A | 3/1992 | Steele | |
| 6,542,075 B2 | 4/2003 | Barker et al. | |
| 6,768,661 B2 | 7/2004 | Vyvoda et al. | |
| 7,631,327 B2 | 12/2009 | Dempski et al. | |
| 7,760,230 B2 | 7/2010 | Russell et al. | |
| 7,847,820 B2 | 12/2010 | Vallone et al. | |
| 8,412,783 B2 | 4/2013 | Boston et al. | |
| 8,516,019 B2 | 8/2013 | Hunt et al. | |
| 8,676,027 B2 | 3/2014 | Hugosson | |
| 8,725,940 B2 | 5/2014 | Grube et al. | |
| 8,825,721 B2 | 9/2014 | Hunt et al. | |
| 9,037,921 B1 | 5/2015 | Brooker et al. | |
| 9,215,423 B2 | 12/2015 | Kimble et al. | |
| 9,414,109 B2 | 8/2016 | Cheng et al. | |
| 9,455,010 B1 * | 9/2016 | Chen | G11C 11/14 |
| 9,489,580 B2 | 11/2016 | Laska et al. | |
| 9,781,479 B2 | 10/2017 | Klappert et al. | |
| 9,836,248 B2 | 12/2017 | Zhang et al. | |
| 10,007,442 B2 | 6/2018 | Hahn et al. | |
| 10,095,445 B2 | 10/2018 | De et al. | |
| 10,228,854 B2 | 3/2019 | Romanovsky et al. | |
| 2001/0044856 A1 | 11/2001 | Agesen et al. | |

(Continued)

FOREIGN PATENT DOCUMENTS

| | | |
|---|---|---|
| EP | 1173020 A2 | 1/2002 |
| EP | 1173020 A3 | 7/2002 |

(Continued)

OTHER PUBLICATIONS

U.S. Appl. No. 16/818,452, filed Mar. 2020, Muthiah et al.

(Continued)

*Primary Examiner* — Mishawn N. Hunter
(74) *Attorney, Agent, or Firm* — Brinks Gilson & Lione

(57) ABSTRACT

A storage system and method for video frame segregation to optimize storage are provided. In one embodiment, a storage system is presented comprising a memory and a controller. The controller is configured to: receive a video stream from a host; identify a plurality of video frame types from the video stream; and store video frames of different video frame types in the memory using different storage options. Other embodiments are provided.

20 Claims, 6 Drawing Sheets

(56) References Cited

U.S. PATENT DOCUMENTS

| | | | |
|---|---|---|---|
| 2005/0114898 A1* | 5/2005 | Seo | H04N 19/132 725/90 |
| 2006/0190419 A1 | 8/2006 | Bunn et al. | |
| 2008/0218448 A1* | 9/2008 | Park | G09G 3/2014 345/76 |
| 2009/0319255 A1 | 12/2009 | Vengerov | |
| 2014/0078256 A1* | 3/2014 | Ogawa | H04N 13/106 348/43 |
| 2015/0012671 A1 | 1/2015 | Park et al. | |
| 2015/0237351 A1 | 8/2015 | Lee et al. | |
| 2016/0345009 A1 | 11/2016 | Zhong et al. | |
| 2017/0285968 A1 | 10/2017 | Jung et al. | |
| 2018/0068540 A1 | 3/2018 | Romanenko | |
| 2018/0189635 A1 | 7/2018 | Olarig et al. | |
| 2018/0341410 A1 | 11/2018 | Benisty | |
| 2019/0079677 A1 | 3/2019 | Malladi et al. | |
| 2019/0104341 A1 | 4/2019 | Catalano et al. | |
| 2019/0163622 A1 | 5/2019 | Wu et al. | |
| 2019/0243754 A1 | 8/2019 | Yu et al. | |
| 2019/0246130 A1 | 8/2019 | Sheikh | |

FOREIGN PATENT DOCUMENTS

| | | |
|---|---|---|
| EP | 2 141 928 A1 | 1/2010 |
| JP | 2010-161740 A | 7/2010 |
| KR | 10-2018-0114972 A | 10/2018 |
| WO | WO2015/154549 A1 | 10/2015 |
| WO | WO 2017/134110 A1 | 8/2017 |

OTHER PUBLICATIONS

U.S. Appl. No. 16/781,717, filed Feb. 2020, Muthiah et al.
U.S. Appl. No. 15/929,090, filed Jan. 2019, Muthiah et al.
U.S. Appl. No. 16/670,112, filed Oct. 2019, Muthiah et al.
European Search Report in EP Application No. 19216071.1, dated Feb. 7, 2020, 8 pages.
"Trick mode"; Wikipedia entry; downloaded from the Internet at https://en.wikipedia.org/wiki/Trick_mode on Jul. 22, 2019; 1 page.
"MPEG transport stream"; Wikipedia entry; downloaded from the Internet at https://en.wikipedia.org/wiki/MPEG_transport_stream on Jul. 22, 2019; 6 pages.
Singh, S. et al.; "Real-Time Implementation of Change Detection for Automated Video Surveillance System"; Research article; ISRN Electronics, vol. 2013, Article ID 691930; 5 pages; Jun. 11, 2013.
U.S. Appl. No. 16/708,091, filed Dec. 9, 2019 entitled "Storage System and Method for Video Frame Segregation to Optimize Storage."
Office Action in U.S. Appl. No. 15/929,090, dated Feb. 20, 2020, 17 pages.
Office Action in U.S. Appl. No. 15/929,090, dated Sep. 27, 2019, 16 pages.
"Data differencing"; Wikipedia entry; downloaded from the Internet at https://en.wikipedia.org/wiki/Data_differencing on Aug. 6, 2019; 3 pages.
"H.264/MPEG-4 AVC"; Wikipedia entry; downloaded from the Internet at https://en.wikipedia.org/wiki/H.264/MPEG-4 AVC on Aug. 6, 2019; 18 pages.
"Video compression picture types"; Wikipedia entry; downloaded from the Internet at https://en.wikipedia.org/wiki/Video_compression_picture_types on Aug. 6, 2019; 4 pages.
U.S. Appl. No. 15/929,090, filed Jan. 11, 2019.
U.S. Appl. No. 16/781,717, filed Feb. 4, 2020 entitled "Storage System and Method for Optimized Surveillance Search."
U.S. Appl. No. 16/781,688, filed Feb. 4, 2020 entitled "Storage System and Method for Automatic Data Phasing."
International Search Report dated Aug. 26, 2020 for International Application No. PCT/US2020/024852.
Written Opinion dated Aug. 26, 2020 for International Application No. PCT/US2020/024852.

* cited by examiner

STORAGE SYSTEM AND METHOD FOR VIDEO FRAME SEGREGATION TO OPTIMIZE STORAGE

BACKGROUND

A storage system can be used to store a data stream sent to it by a host. In a surveillance or digital video recorder (DVR) environment, the data can be stored in memory in the Moving Picture Experts Group Transport Stream (MPEG-TS) format. The entire stream is stored as a single entity, which is usually advantageous because the data can be easily stored and retrieved that way. With surveillance data, typically only a portion of the data is required to be stored after a period of time. To remove the unneeded data, the data stream is read from memory, the unnecessary video frames are removed, and the resulting new stream is stored back in memory.

DETAILED DESCRIPTION

Overview

Figure 1A:
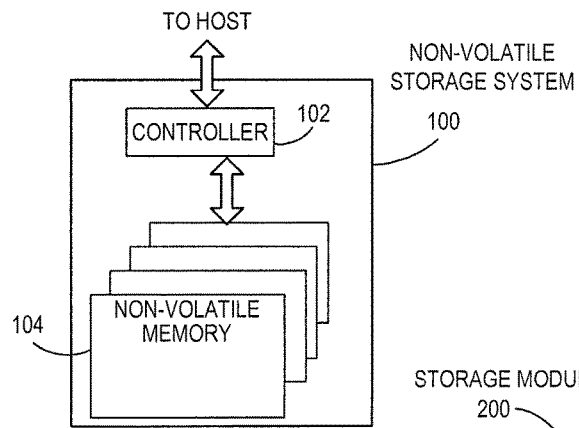
FIG. 1A is a block diagram of a non-volatile storage system of an embodiment.

By way of introduction, the below embodiments relate to a storage system and method for video frame segregation to optimize storage. In one embodiment, a storage system is presented comprising a memory and a controller. The controller is configured to: receive a video stream from a host; identify a plurality of video frame types from the video stream; and store video frames of different video frame types in the memory using different storage options.

In some embodiments, the different storage options are different levels of endurance.

In some embodiments, a first video frame type is an intra-coded picture frame (I-frame) and a second video frame type is a predicted picture frame (P-frame) or a bidirectional predicted picture frame (B-frame).

In some embodiments, an I-frame is stored with a higher level of endurance than a P-frame or a B-frame.

In some embodiments, the controller is further configured to, after an elapsed period of time, delete video frames of one video frame type while retaining the video frames of another video frame type.

In some embodiments, the controller is configured to identify the plurality of video frame types based on information received from the host.

In some embodiments, the memory comprises a three-dimensional memory.

In some embodiments, the storage system is configured to be integrated in the host.

In some embodiments, the storage system is configured to be removably connected with the host.

In another embodiment, a method for video frame segregation is presented that is performed in a storage system in communication with a host, the storage system comprising a memory. The method comprises: receiving, from the host, a plurality of video frames extracted from a video stream by the host; receiving, from the host, instructions on a storage parameter to be used by the storage system to store each of the video frames, wherein video frames of different video frame types have different storage parameters; and storing each of the plurality of video frames in the memory using the storage parameters specified by the host.

In some embodiments, the different storage parameters are different levels of endurance.

In some embodiments, a first video frame type is an intra-coded picture frame (I-frame) and a second video frame type is a predicted picture frame (P-frame) or a bidirectional predicted picture frame (B-frame).

In some embodiments, an I-frame is stored with a higher level of endurance than a P-frame or a B-frame.

In some embodiments, the method further comprises after an elapsed period of time, deleting video frames of one video frame type while retaining the video frames of another video frame type.

In another embodiment, a storage system is presented comprising a memory and means for storing different video frames from a video stream in the memory using different storage parameters according to a video frame's expected storage lifetime in the memory.

In some embodiments, the different storage parameters are different levels of endurance.

In some embodiments, the different video frames comprise (i) an intra-coded picture frame (I-frame) and (ii) a predicted picture frame (P-frame) and/or a bidirectional predicted picture frame (B-frame).

In some embodiments, the memory comprises a three-dimensional memory.

In some embodiments, the storage system is configured to be integrated in a host.

In some embodiments, the storage system is configured to be removably connected with a host.

Other embodiments are possible, and each of the embodiments can be used alone or together in combination. Accordingly, various embodiments will now be described with reference to the attached drawings.

Embodiments

Figure 1B:
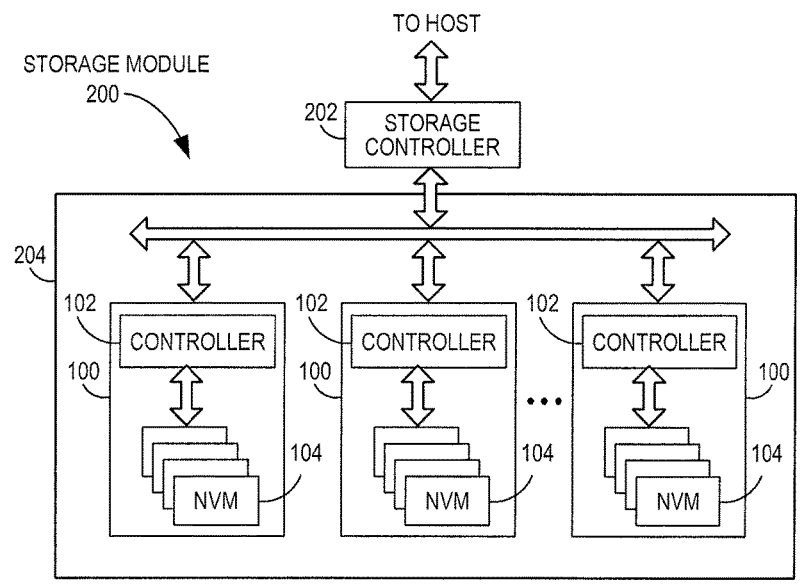
FIG. 1B is a block diagram illustrating a storage module of an embodiment.
Figure 1C:
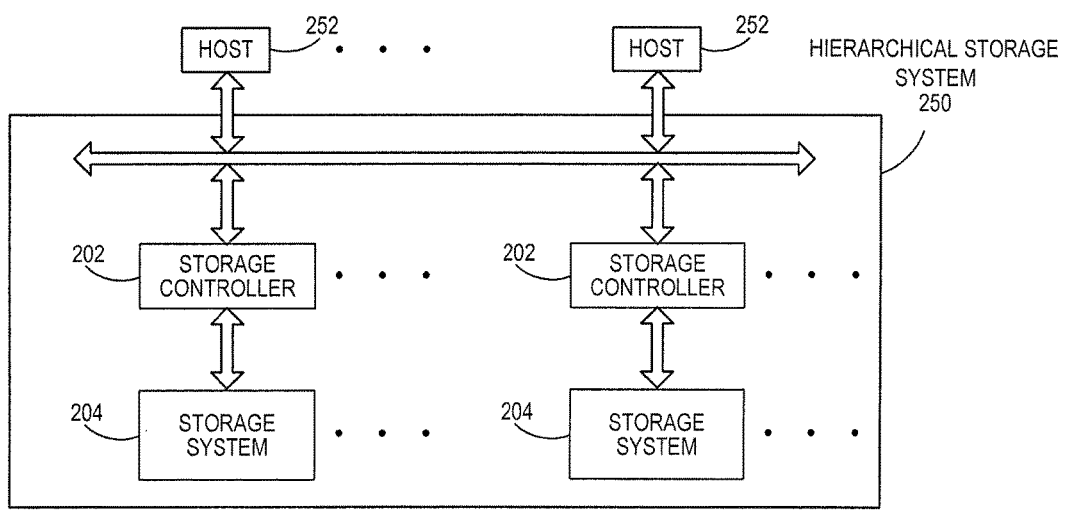
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
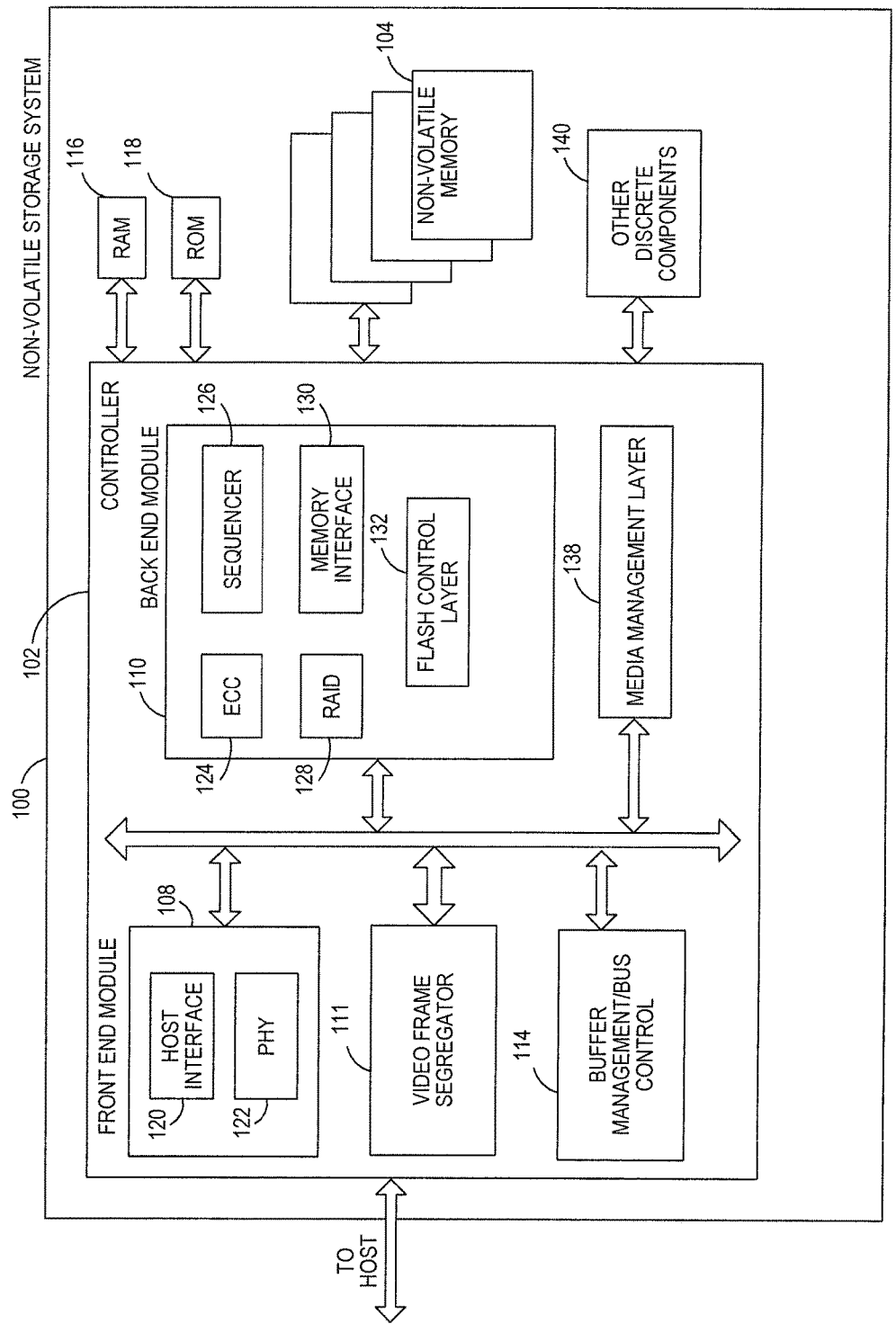
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a video frame segregator 111, which is discussed in more detail below, and can be implemented in hardware or software/firmware to extract various video frames from a video stream. The video frame segregator 111 can be configured to perform the algorithms and methods discussed below and shown in the attached drawings.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
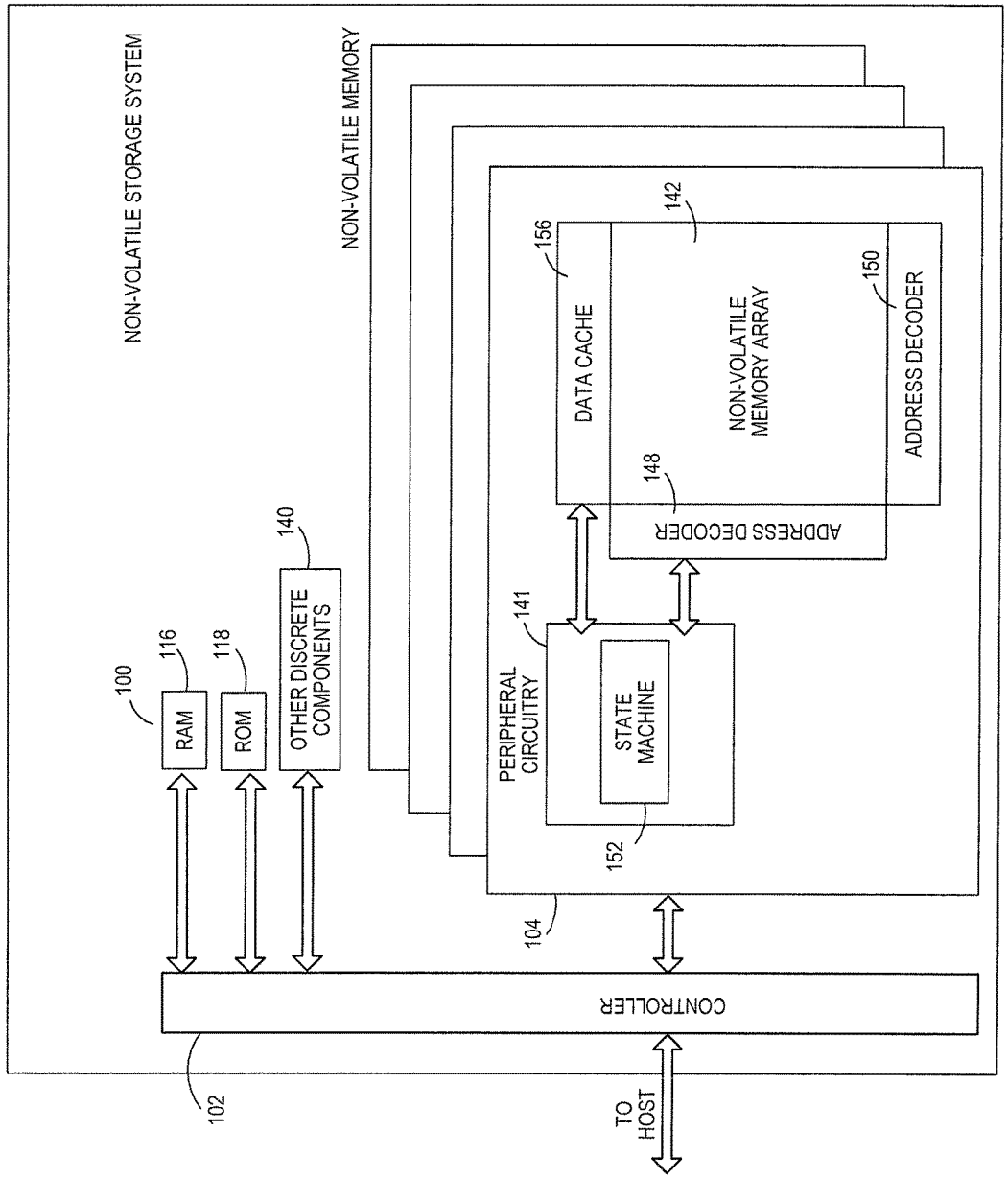
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
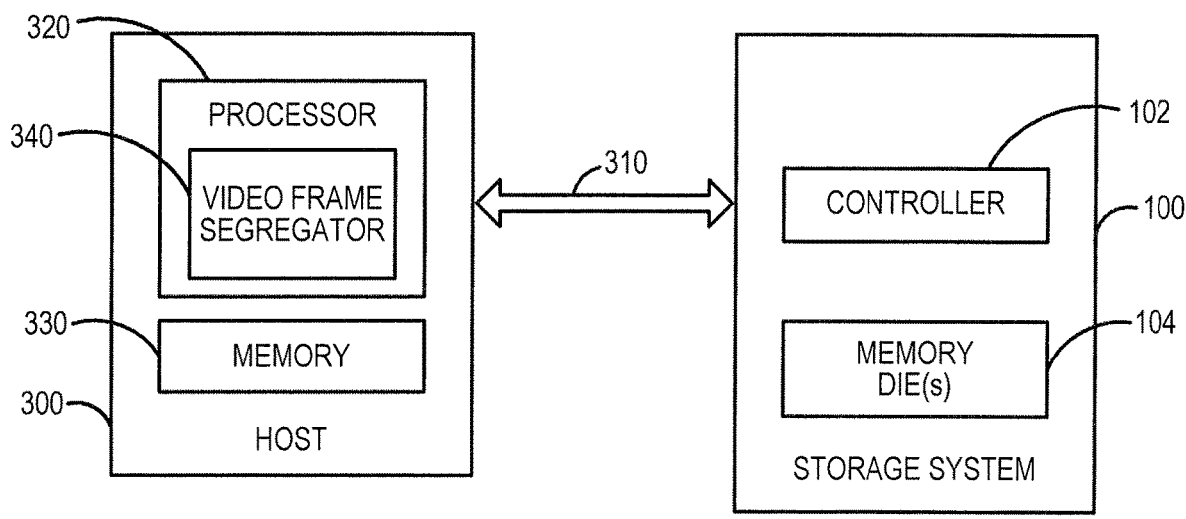
FIG. 3 is a block diagram of a host and storage system of an embodiment.

Returning again to the drawings, FIG. 3 is a block diagram of a system of an embodiment comprising a host 300 and the storage system 100. The host 300 can take any suitable form, including, but not limited to, a computer, a mobile phone, a tablet, a wearable device, a digital video recorder, a surveillance system, etc. The host 300 in this embodiment comprises a processor 320 and a memory 330. The processor 320 is configured to implement a video frame segregator 340. In one embodiment, computer-readable program code of the video frame segregator 340 is stored in the memory 330 and is executed by the processor 320 (i.e., the video frame segregator 340 can be software/firmware executed by hardware). In another embodiment, the video frame segregator 340 is implemented exclusively in hardware. In any event, in one embodiment, the video frame segregator 340 can be used to extract various video frames from a video stream, as shown and described herein.

As mentioned above, a storage system can be used to store a data stream sent to it by a host. In a surveillance or digital video recorder (DVR) environment, the data can be stored in memory in the Moving Picture Experts Group Transport Stream (MPEG-TS) format. The entire stream is stored as a single entity, which is usually advantageous because the data can be easily stored and retrieved that way. However, this results in uniform data characteristics (e.g., endurance) across the entire spectrum of data, which is usually not a requirement. Further, practical applications tend to require dynamic protection, endurance, and recoverability for different data types and, sometimes, according to a data source, as in surveillance environments.

Also, with surveillance data, typically only a portion of the data is required to be stored after a period of time (e.g., two months). This is usually done to keep up with storage requirements, with quality of service of older data being traded for storage capacity (e.g., up to 50% of storage). To remove the unneeded data, the data stream is read from memory, the unnecessary video frames are removed, and the resulting new stream is stored back in memory, which may be an inefficient process that reduces performance and increases write amplification. Further, the frames that will be removed are stored with the same endurance and protection parameters as those that will be kept. The same issue is present with different packet identifiers.

The following embodiments can be used to address these issues. More specifically, in one embodiment, a plurality of different video frame types are extract from a video stream (either by the host 300 or the storage system 100), and video frames of different video frame types are stored in the memory of the storage system using different storage options, wherein video frames of one video frame type are stored with a different storage option than video frames of another video frame type. This addresses the problem mentioned above where storing the MPEG-TS data as a single stream creates throughput issues when the data is phased down after an elapsed time. This embodiment recognizes that some frames are more important than other frames, so they can be stored with different storage options, such as endurance and protection. These embodiments can also be performed on different packet identifiers (PIDs), which are the data that identifies each table or elementary stream in a transport stream. By use of the "segregated routing" of this embodiment, performance can be increased, and write amplification can be decreased.

The following paragraphs provide an example use of one embodiment in which the data stream is in the MPEG-TS format. It should be understood that this is merely an example, and other types of formats, frame types, and storage options can be used.

In general, with video compression, different video frames are compressed using different compression algorithms. Different video frames can be classified into different picture or frame types. Three of the major picture types are intra-coded picture frames (I-frames), predicted picture frames (P-frames), and bidirectional predicted picture frames (B-frames). I-frames are the least compressible but are independent in that they can be decoded without reference to other video frames. An I-frame can be a complete image, such as a Joint Photographic Experts Group (JPEG) image file. In contrast, a predicted picture frame (P-frame) (or delta frame) contains the changes in the image from the previous frame and requires reference to other video frames to be decompressed. However, P-frames are more compressible that I-frames. A bidirectional predicted picture frame (B-frame) contains differences between the current frame and both the preceding and following frames. Accordingly, B-frames provide the highest amount of data compression.

Figure 4:
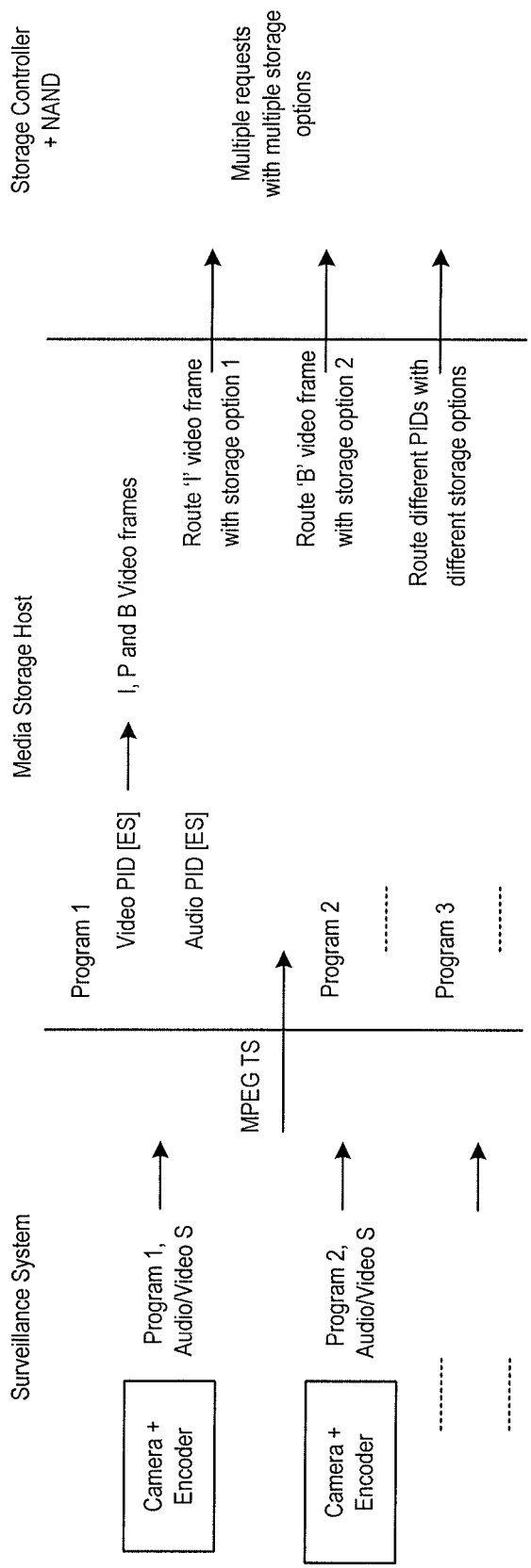
FIG. 4 is a flow chart of a method of an embodiment for video frame segregation that is performed by a host.
Figure 5:
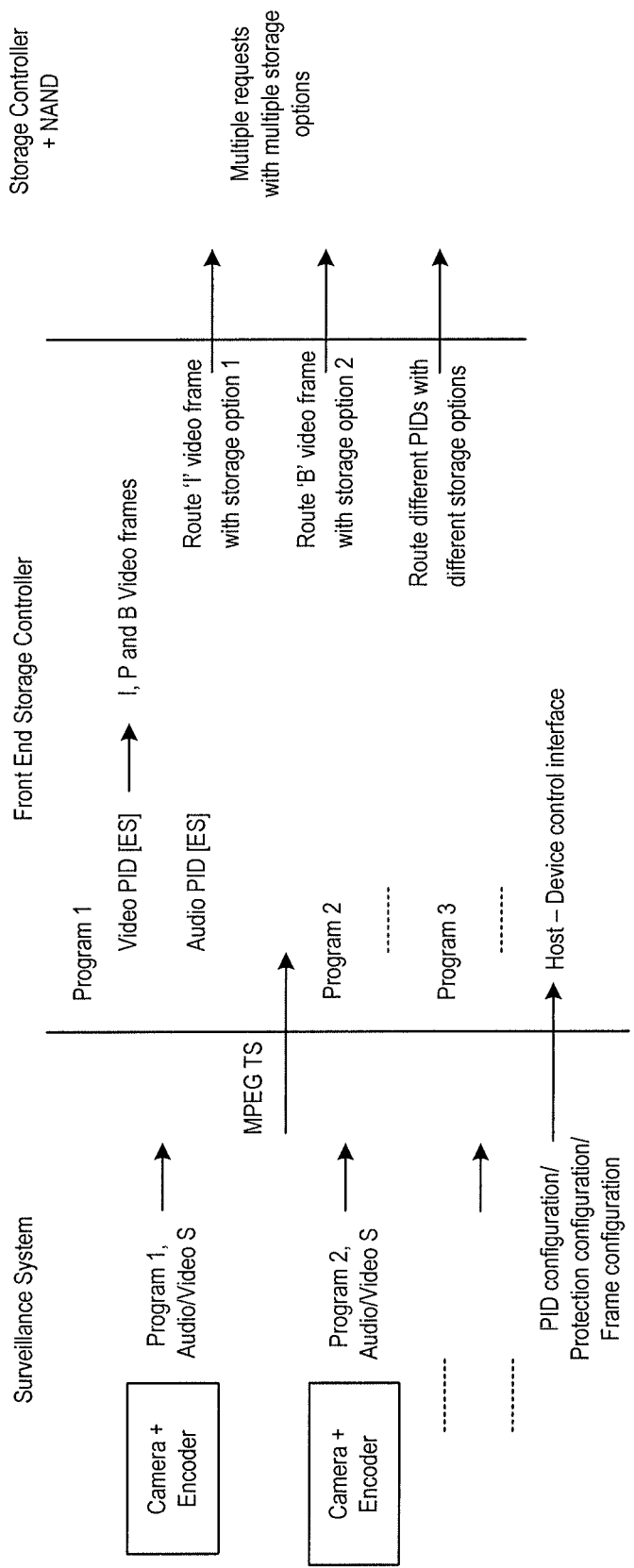
FIG. 5 is a flow chart of a method of an embodiment for video frame segregation that is performed by a storage system.

As noted above, either the host 300 and/or the storage system 100 can extract frames from the video stream. FIGS. 4 and 5 will now be discussed to illustrate these two respectively options.

Turning first to FIG. 4, in this example, the host 300 is in communication with a surveillance system. The surveillance system has two or more cameras with encoders, each outputting a program with audio and video components. These programs are provided to the host 300 in the MPEG-TS format. When the host 300 receives the programs, the video frame segregator 340 of the processor 340 of the host 300 extracts the elementary streams (ESs) from the audio and video packed identifiers (PIDs) of each program (i.e., the PIDs are extracted from the MPEG-TS, then the corresponding audio/video ESs are obtained from those program PIDs). The elementary streams are the outputs of the audio/video encoders of the cameras that contain only one kind of data (e.g., audio or video). Based on the information in the packet identifiers, the video frame segregator 340 can identify the various video frame types in the video stream. With this information, the video frame segregator 340 separately extracts the I-, B-, and/or P-frames.

The processor 320 of the host 300 then issues commands to the storage system 100 to store the different frames (and, optionally, the different PIDs) with different storage options. For example, the I-frames can be routed to the storage system 100 with a high level of protection and read recoverability option, and the B- and P-frames can be routed to the storage system 100 with fast fail or a default storage option. In this way, the host 300 is streaming frames of the elementary stream rather than the transport stream itself. Since I-frames, which are individually decodable, are stored separately for better endurance, a stream of individually-decodable video frames is streamed to a block of memory. These individual frames can be distinguished from the transport stream since the transport stream follows the MPEG specification, which includes a program association table (PAT), program map table (PMT), and other data structures that are not present in individual video frames.

The storage system 100 then stores the different frames with the different storage options in the memory 104. For example, the storage system 100, on host 300 directive, can store the I-frames with high endurance trim in a separate block of memory 104 and can store the B-and P-frames with a default/less endurance trim into another block of memory. If the I-frames are the frames that will be retained and the B-and P-frames are the frames that will deleted at the phase-out time, it may be preferred to store the I-frames with higher storage endurance than the B-and P-frames. If B-and P-frames will be deleted before the I-frames, the B-and P-frames do not need as high of endurance as the I-frames, which will be stored for longer. (However, it is not always the case that the delta frames will be deleted before the I-frames.) In this way, performing storage of different frames with different storage options, instead of storing the video stream as a single entity, can be used to leverage memory parameters.

This provides advantages over the prior approach of storing the entire video stream as one entity in the storage system's memory 104. In general, I-frames are considered critical in applications, such as surveillance, because they are fundamental for video playback. P-frames and B-frames are delta frames without which video is still sustainable but with some quality of service degradation, as they usually bring smoothness to the motion video. Routing I-frames separately from the delta frames (the P- and B-frames) into different storage blocks enables cleaning up the delta frames block altogether easing the background relocation process when the video is to be phased out. The I-frames are retained longer in a separate block without any garbage collection hassle. This optimizes the phasing down of older video data with reduced quality of service at every phase. Thus, this embodiment can used to provide different amounts of data/redundancy for the various frame types. Further, apart from optimal storage system performance, overall endurance of the memory 104 is increased since the data is well segregated and written to that destination where it should belong to. Improving endurance has a cost-benefit since fewer blocks are required for the same number of device cycles. Such a benefit adds value to cost-sensitive retail segment. Additionally, segregating and storing different video frames according to their expected lifetime in the storage system 100 can result in fewer garbage collection operations.

As mentioned above, instead of the host 300 extracting the frames, the controller 102 (e.g., using its video frame segregator 111) can extract the frames (e.g., the MPEG-TS segregation/routing decision can be performed inside storage system 100). This embodiment is shown in FIG. 5. FIG. 5 is similar to FIG. 4, but instead of the host 300 doing the extracting, the front-end storage controller (or any other suitable component in the storage system 100) is doing the extracting, optionally with some configuration support from the host 300. In this alternative, the storage system 100 is more active and performs the video frame segregation itself to generate independent coded media and subsequently segregates the video frames out of it (e.g., on host directive). The host 300 can provide some feedback over an interface on, for example, what packet identifiers are important and on the amount of bias the storage system 100 should bias the elementary stream in terms of data retention, protection, and recoverability. In operation, the host 100 can have a hinting mechanism that marks video frames for segregation into different blocks depending on their usage, and the storage system 100 can automatically detect frame types based on the hints. The storage system 100 can use derived or host-initiated inputs in order to segregate the video frames into a plurality of pools of memory that may be managed independently. The host 300 can also instruct the storage system 100 to give priority to some video packet identifiers over others, along with the video frames, for protection and recoverability during storage.

Irrespective of which entity is doing the video frame segregation, the host 300 can be configured to dispose of the unwanted frames in the video stream by sending a delete instruction to the storage system 100 after an elapsed time. (Alternatively, the storage system 100 can be configured with this ability.) For example, for typical video decoding, B- and P-frames are dependent on other frames, while I-frames are not dependent on any other frame. This can be leveraged in the storage system 100 for phased removal to retrieve capacity in phases, with the B- and P-frames being disposed in first phase of data reduction and I-frames being disposed when the whole video program needs to be removed from the storage system 100. Garbage collection can be greatly reduced if the video frames are stored in the memory 104 with information on which phase the data will be removed.

As another example, in a multi-shoot surveillance system (such as in FIGS. 4 and 5), the video stream typically is formed out of multiple packet identifiers from multiple cameras. The host 300 can decide to keep an individual or a group of packet identifiers (e.g., based on priority/importance of the camera's location) in one memory and another group of packet identifiers in another memory. Enabling similar video stream parsing to retrieve elementary streams and provide different storage instruction to perform need-based routing can optimize overall system throughput with the appropriate endurance and performance for different sources of data.

In some cases, along with elementary stream segregation, the host 300 can also identify important and ignored video packet identifiers in the transport stream. For example, the packet identifiers associated with a camera recording a program in a bank locker/teller section can be compared to a camera generating a program in the pantry hall. The elementary stream of the corresponding packet identifiers can be stored in a biased manner along with biased frame storage.

After the unwanted frames are removed from memory storage, the remaining frames may be able to be used to recreate the video stream in some fashion. For example, the host 300 can be configured with the appropriate logic to recreate the MPEG-TS video stream with shortened elementary streams for subsequent playback.

It should be noted that there are many alternatives that can be used with these embodiments. For example, while the above embodiments were discussed in terms of video, these embodiments can also be applied to other types of media, such as images, for example. Like video, images can have "important" data, as well as "unimportant" data, such as metadata, that may improve quality of service but is not necessary to decode.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention.

Finally, it should be noted that any aspect of any of the embodiments described herein can be used alone or in combination with one another.

What is claimed is:

1. A storage system comprising:
    a memory; and
    a controller configured to:
        receive a video stream from a host;
        identify a plurality of video frame types from the video stream;
        store video frames of different video frame types in the memory using different storage options; and
        after an elapsed period of time, delete video frames of one video frame type while retaining video frames of another video frame type.

2. The storage system of claim 1, wherein the different storage options are different levels of endurance.

3. The storage system of claim 1, wherein:
    a first video frame type is an intra-coded picture frame (I-frame); and
    a second video frame type is a predicted picture frame (P-frame) or a bidirectional predicted picture frame (B-frame).

4. The storage system of claim 3, wherein an I-frame is stored with a higher level of endurance than a P-frame or a B-frame.

5. The storage system of claim 1, wherein the controller is further configured to identify the plurality of video frame types based on information received from the host.

6. The storage system of claim 1, wherein the memory comprises a three-dimensional memory.

7. The storage system of claim 1, wherein the storage system is configured to be integrated in the host.

8. The storage system of claim 1, wherein the storage system is configured to be removably connected with the host.

9. The storage system of claim 1, wherein the video stream is from a surveillance camera.

10. A method for video frame segregation, the method comprising:
    performing the following in a storage system in communication with a host, the storage system comprising a memory:
        receiving, from the host, a plurality of video frames extracted from a video stream by the host;
        receiving, from the host, instructions regarding a storage parameter to be used by the storage system to store each of the video frames, wherein video frames of different video frame types have different storage parameters;
        storing each of the plurality of video frames in the memory using the storage parameters specified by the host; and
        after an elapsed period of time, deleting video frames of one video frame type while retaining video frames of another video frame type.

11. The method of claim 10, wherein the video stream is from a surveillance camera.

12. The method of claim 10, wherein the different storage parameters are different levels of endurance.

13. The method of claim 10, wherein:
    a first video frame type is an intra-coded picture frame (I-frame); and
    a second video frame type is a predicted picture frame (P-frame) or a bidirectional predicted picture frame (B-frame).

14. The method of claim 13, wherein an I-frame is stored with a higher level of endurance than a P-frame or a B-frame.

15. A storage system comprising:
- a memory;
- means for storing different video frames from a video stream in the memory using different storage parameters according to a video frame's expected storage lifetime in the memory; and
- means for deleting, after an elapsed period of time, video frames of one video frame type while retaining video frames of another video frame type.

16. The storage system of claim 15, wherein the different storage parameters are different levels of endurance.

17. The storage system of claim 15, wherein the different video frames comprise:
  (i) an intra-coded picture frame (I-frame); and
  (ii) a predicted picture frame (P-frame) and/or a bidirectional predicted picture frame (B-frame).

18. The storage system of claim 15, wherein the memory comprises a three-dimensional memory.

19. The storage system of claim 15, wherein the storage system is configured to be integrated in a host.

20. The storage system of claim 15, wherein the storage system is configured to be removably connected with a host.

* * * * *